US012148910B2

United States Patent
Onye et al.

(10) Patent No.: US 12,148,910 B2
(45) Date of Patent: Nov. 19, 2024

(54) THERMAL MANAGEMENT SYSTEMS WITH PASSIVE QUENCHING SACKS FOR LIQUID IMMERSION COOLED BATTERY ASSEMBLIES

(71) Applicant: GM GLOBAL TECHNOLOGY OPERATIONS LLC, Detroit, MI (US)

(72) Inventors: Jermain E. Onye, Raleigh, NC (US); Ryan P. Hickey, Austin, TX (US); Pooja Suresh, Madison Heights, MI (US); Andrew P. Oury, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 197 days.

(21) Appl. No.: 17/868,035

(22) Filed: Jul. 19, 2022

(65) Prior Publication Data

US 2024/0030519 A1 Jan. 25, 2024

(51) Int. Cl.
*H01M 10/6567* (2014.01)
*H01M 10/613* (2014.01)
(Continued)

(52) U.S. Cl.
CPC ..... *H01M 10/6567* (2015.04); *H01M 10/613* (2015.04); *H01M 10/625* (2015.04);
(Continued)

(58) Field of Classification Search
CPC ........... H01M 10/6567; H01M 10/613; H01M 10/625; H01M 10/651; H01M 50/249;
(Continued)

(56) References Cited

U.S. PATENT DOCUMENTS

| 4,350,026 | A  | 9/1982  | Klein        |
|-----------|----|---------|--------------|
| 6,889,515 | B2 | 5/2005  | Tilton et al.|
| 6,955,063 | B2 | 10/2005 | Adiga et al. |
| 8,329,325 | B2 | 12/2012 | Brodie et al.|

(Continued)

FOREIGN PATENT DOCUMENTS

| DE | 102019121308 A1 | * | 2/2021 |
| KR | 20210011262     | * | 2/2021 |
| KR | 20220132353     | * | 9/2022 |

OTHER PUBLICATIONS

Machine translation of DE-102019121308-A1 (Year: 2024).*

*Primary Examiner* — Milton I Cano
*Assistant Examiner* — Albert Michael Hilton
(74) *Attorney, Agent, or Firm* — Quinn IP Law (57) ABSTRACT

Presented are thermal management systems with passive quenching sacks for cooling battery assemblies, methods for making/using such systems, and vehicles equipped with such systems. A passive thermal management (PTM) system is presented for cooling a battery assembly, such as a traction battery pack with a battery case containing stacked battery cells. The PTM system includes a fluid container that mounts inside the battery assembly, interposed between the battery case and battery cells. The fluid container stows therein a dielectric coolant fluid and has multiple fluid ports that fluidly connect to the battery cells to dispense thereto the coolant fluid. Thermomechanical plugs, such as wax, film, or smart-material barriers, seal the fluid container ports and passively open (e.g., melt, bend, disintegrate, expand, etc.) at a predefined temperature to thereby unseal the fluid ports such that the coolant fluid is fed from the fluid container into the battery cells.

20 Claims, 3 Drawing Sheets

(51) Int. Cl.
*H01M 10/625* (2014.01)
*H01M 10/651* (2014.01)
*H01M 50/249* (2021.01)
*H01M 50/342* (2021.01)
*H01M 50/375* (2021.01)

(52) U.S. Cl.
CPC ....... *H01M 10/651* (2015.04); *H01M 50/249* (2021.01); *H01M 50/3425* (2021.01); *H01M 50/375* (2021.01); *H01M 2220/20* (2013.01)

(58) Field of Classification Search
CPC ........... H01M 50/3425; H01M 50/375; H01M 2220/20
See application file for complete search history.

(56) References Cited

U.S. PATENT DOCUMENTS

| | | |
|---|---|---|
| 8,383,260 B2 | 2/2013 | Essinger et al. |
| 8,435,668 B2 | 5/2013 | Kumar et al. |
| 8,563,154 B2 | 10/2013 | Graban et al. |
| 8,852,772 B2 | 10/2014 | McDonald |
| 10,003,112 B1 | 6/2018 | Boor et al. |
| 10,923,287 B1 | 2/2021 | Coppola et al. |
| 2009/0249807 A1 | 10/2009 | Nemesh et al. |
| 2011/0200860 A1 | 8/2011 | Brodie et al. |
| 2018/0287156 A1* | 10/2018 | Yu .............................. C09C 1/36 |
| 2019/0357386 A1 | 11/2019 | Coppola et al. |
| 2021/0218004 A1* | 7/2021 | Morr ................. H01M 10/6556 |
| 2022/0102780 A1 | 3/2022 | Hickey et al. |
| 2022/0359931 A1* | 11/2022 | Lee ....................... H01M 10/486 |
| 2023/0238632 A1* | 7/2023 | Kritzer ................ H01M 10/613 |
| | | 429/62 |
| 2023/0291064 A1* | 9/2023 | Kim .................... H01M 50/271 |

\* cited by examiner

THERMAL MANAGEMENT SYSTEMS WITH PASSIVE QUENCHING SACKS FOR LIQUID IMMERSION COOLED BATTERY ASSEMBLIES

INTRODUCTION

The present disclosure relates generally to electrochemical devices. More specifically, aspects of this disclosure relate to thermal management systems for regulating the temperatures of battery assemblies in thermal runaway.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds and ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise and may push the battery assembly towards an unstable state. Such thermal events, if left unchecked, may lead to a more accelerated heat-generating state called "thermal runaway", a condition in which the battery system is incapable of returning the internal battery components to normal operating temperatures. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels and pipes within the battery case. In contrast, direct liquid cooling systems—or "liquid immersion cooling" (LIC) systems—immerse the battery cells within a direct-conduction liquid dielectric coolant.

SUMMARY

Presented herein are thermal management systems with passive quenching sacks for cooling battery assemblies, methods for manufacturing and methods for operating such systems, and electric-drive vehicles equipped with such thermal management systems for cooling lithium-class traction battery packs. For example, there are disclosed passive thermal management (PTM) systems with one or more dielectric coolant-containing bags that passively activate to quench cylindrical or prismatic lithium-class battery cells to preclude a thermal runaway (TR) event. A coolant bag may be laid across each row of cells, packaged inside the battery pack/module housing, for gravity or pressure feeding coolant into each cell. Alternatively, a single coolant bag with discrete internal fluid chambers may be laid across and shared by all battery cells in a module/pack. Each coolant bag may be fabricated with a series of thermomechanical "sacrificial" plugs, such as microcrystalline wax or aluminum foil barriers, that melt, disintegrate, or otherwise open at an engineered activation temperature. When opened, the plugs allow dielectric coolant to dispense from the bag into the battery cell containers; the coolant absorbs thermal energy at the cell initiation area of a TR event. Dielectric coolant may be fed from the coolant bag through a shared fluid vent or a dedicated flood port in each cell container. For shared vent designs, coolant in the passive quenching system (PQS) dispenses into the cell and quenches the jellyroll after the cell completes venting of TR gases through the shared vent.

Attendant benefits for at least some of the disclosed concepts include a passive thermal management system that immediately activates when a cell exhibits signs of a TR event. Doing so eliminates the need for active TR sensing devices or controller-automated active TR mitigation. With lower energy released to the cell's solid can, cell-to-cell (C2C) barrier sizing may be reduced, which helps to reduce packaging space demands and prevent C2C thermal propagation. Other attendant benefits may include convective TR gasses flowing through the dielectric coolant, which may result in lower gas temperatures leaving the RES S. A coolant manifold may connect the bags of neighboring cell stacks to increase available fluid over all cell terminals that may improve overall cooling capabilities across cell stacks. In addition to reducing reliance on active thermal mitigation and related time sensitivities, cooling efficacy is improved with a concomitant increase in battery capacity, which leads to improvements in overall vehicle efficiency and increased driving range.

Aspects of this disclosure are directed to thermal management systems with passively activated quenching vessels for cooling battery assemblies. In an example, there is presented a passive thermal management system for regulating the operating temperature of a battery assembly. This PTM system includes a fluid container that mounts inside the battery assembly, inserting between the battery case and the battery cells. The fluid container, which stows therein a coolant (e.g., dielectric LIC fluid), has multiple (first) fluid ports that fluidly connect to the battery cells and deliver thereto the coolant. A set of (first) thermomechanical plugs seals the (first) fluid ports; these thermomechanical plugs are structurally engineered to passively open at a predefined temperature to thereby unseal the fluid ports. In so doing, the coolant fluid is gravity or pressure fed from the fluid container, through the unsealed ports, and into the cell cases of the battery cells.

Additional aspects of this disclosure are directed to motor vehicles with LIC-type thermal management systems for cooling lithium-class traction battery packs. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles, motorcycles, farm equipment, watercraft, aircraft, etc. For non-automotive applications, disclosed concepts may be implemented for any logically relevant use, including stand-alone power stations and portable power packs, photovoltaic systems, pumping equipment, machine tools, server systems, etc. While not per se limited, disclosed concepts may be particularly advantageous for use with lithium-class prismatic can-type traction battery packs.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s). The traction battery pack includes a protective battery pack case that contains one or more rows of lithium-class battery cells. In addition to the battery pack and traction motor, the vehicle includes other heat-generating devices that may be cooled by an in-vehicle thermal management system.

Continuing with the preceding discussion, the vehicle is also equipped with a thermal management system that employs a passively activated fluid container to selectively flood one or more of the battery cells with coolant, e.g., a dielectric LIC fluid to prevent or mitigate a TR event. The fluid container is mounted inside the traction battery pack, e.g., located between the battery case cover and the tops of the battery cells. Extending through a bottom wall of the fluid container is a series of fluid ports, each of which is fluidly connected to a respective battery cell to dispense thereto coolant. A thermomechanical plug seals each of the fluid container ports and passively opens at a predefined temperature. The plug, when opened, unseals its respective fluid port such that coolant is fed from the fluid container and into the respective battery cell.

Aspects of this disclosure are also directed to manufacturing workflow processes for making and protocols for using disclosed thermal management systems, battery assemblies, and vehicles. In an example, a method is presented for assembling a passive thermal management system. This representative method includes, in any order and in any combination with any of the above and below disclosed options and features: mounting a fluid container inside a battery assembly such that the fluid container is located between a battery case and a group of battery cells, the fluid container stowing therein a coolant fluid and defining a first plurality of fluid ports configured to fluidly connect to the battery cells and deliver thereto the coolant fluid; and sealing the first plurality of fluid ports with a first plurality of thermomechanical plugs, the first plurality of thermomechanical plugs configured to passively open at a first predefined temperature to thereby unseal the first plurality of fluid ports such that the coolant fluid is pressure or gravity fed from the fluid container into the battery cells.

For any of the disclosed systems, methods, and vehicles, each of the thermomechanical plugs may be a structural barrier that seats inside and/or covers a respective one of the fluid ports. Optionally, each thermomechanical plug may be a single-piece structure that is formed, in whole or in part, from a wax material, a metallic foil material, and/or a smart material. For instance, the single-piece structure may be formed from a microcrystalline wax, an aluminum film, a shape-memory alloy, and/or a shape-memory polymer. The predefined temperature at which each thermomechanical plug passively opens may be a battery-calibrated thermal runaway onset temperature of between about 80 and 120 degrees Celsius (° C.) (i.e., about 175-260 degrees Fahrenheit (° F.)).

For any of the disclosed systems, methods, and vehicles, the fluid container may have a rectangular-polyhedron shape with a bottom wall that faces the battery cells and a top wall that faces the battery case. In this instance, a first set of the fluid ports is spaced along and extends through the bottom wall. As a further option, a second set of fluid ports may be spaced along and extend through the top wall of the fluid container; these ports, when opened, vent therethrough gases generated via the battery cells. A second set of thermomechanical plugs may seal the fluid ports in the top wall of the fluid container; these plugs passively open at a predefined temperature to thereby unseal the top wall ports. It may be desirable that the thermomechanical plugs in the bottom wall be formed, in whole or in part, from one material that passively opens at one distinct predefined temperature, whereas the thermomechanical plugs in the top wall be formed, in whole or in part, from another distinct material that passively opens at anther distinct predefined temperature.

For any of the disclosed systems, methods, and vehicles, each battery cell may include a cell case with a cell vent through which vents gases generated via the battery cell, e.g., during a TR event. In this instance, the fluid ports in the bottom of the fluid container fluidly connect to the battery cells via the cell vents to dispense thereto the coolant fluid. Optionally, each battery cell case may include a flood port, through which enters liquid coolant, and a cell vent, through which vents gases generated via the battery cell. In this example, the fluid ports in the bottom of the fluid container fluidly connect to the battery cells via the flood ports to supply thereto the coolant fluid. It may be desirable that each cell case flood port be larger in size than its mating fluid port in the fluid container.

For any of the disclosed systems, methods, and vehicles, the battery assembly may incorporate multiple mutually parallel rows of stacked battery cells that are contained within the battery case. In this instance, the PTM system may employ a single shared fluid container or multiple distinct fluid containers that mount inside the battery assembly and insert between the battery case and battery cells. For multi-container designs, each fluid container may seat on top of a respective row of stacked battery cells. Each fluid container may be a flexible bag that is formed as a single-piece structure from a polymeric material.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
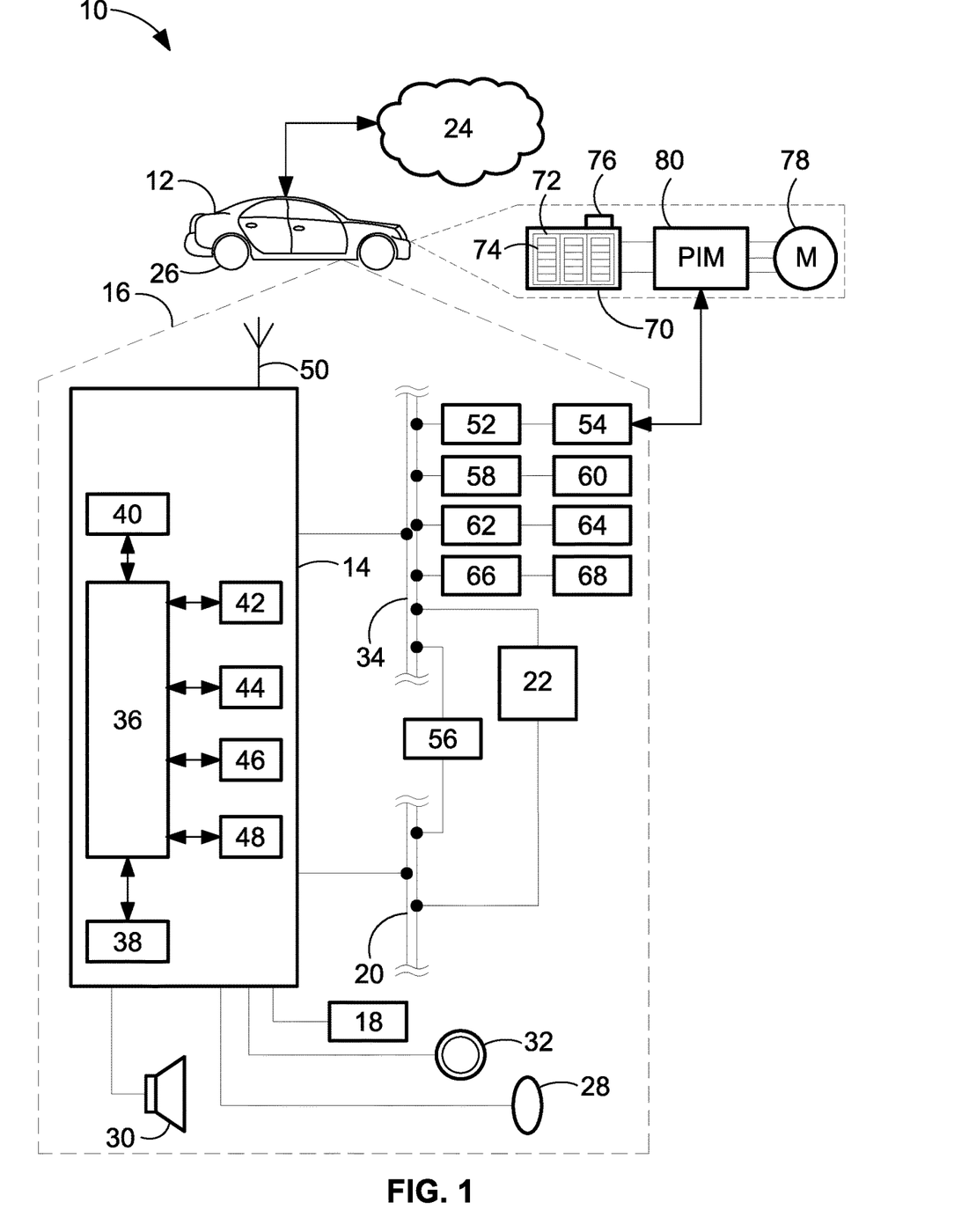
FIG. 1 is a partially schematic, side-view illustration of a representative motor vehicle with an electrified powertrain, a rechargeable traction battery pack, and a passive thermal management system for regulating the operating temperatures of various heat-generating electrical components in accord with aspects of the disclosed concepts.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of vehicle, and utilized for both automotive and non-automotive applications alike. Moreover, only select components of the motor vehicles, battery assemblies, and thermal systems are shown and described in additional detail herein. Nevertheless, the vehicles, assemblies, and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RES S), which may be in the nature of a chassis-mounted traction battery pack 70, that is operatively connected to an electric traction motor (M) 78. The traction battery pack 70 is generally composed of one or more battery modules 72 each having a stack of battery cells 74, such as lithium-class, zinc-class, nickel-class, or organosilicon-class battery cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains.

The battery pack 70 may be configured such that module management, cell sensing, and module-to-module or module-to-host communication functionality is integrated directly into each battery module 72 and performed by an integrated electronics package, such as a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

Under anomalous operating conditions, the battery pack 70 may become damaged or may malfunction in a manner that causes the cells 74 inside the battery modules 72 to generate excessive heat, sometime in excess of 400-500° C. Discussed below are battery-integrated thermal management systems that help to regulate the operating temperatures of the battery cells 74 during high-heat thermal events. By way of non-limiting example, a thermal management system—be it active or passive—may incorporate passively activated quenching sacks to selectively flood any TR-triggering cells with LIC fluid in order to mitigate released energy and reduce temperatures of TR gases exiting the RESS. Thermomechanical "sacrificial" plugs may seal coolant ports that each fluidly connects the coolant sack to a respective cell can, e.g., via a shared gas vent or a dedicated flood port in the cell header. When that cell reaches a TR-triggering temperature, the resultant thermal energy causes the plug to melt, bend, disintegrate, expand, or otherwise open, which concomitantly unseals its respective fluid port and quenches the jellyroll inside the corresponding cell can with dielectric LIC fluid.

Opening the thermomechanical plug and unsealing the coolant port may also enable the venting of TR gases from the cell can and through the coolant sack to exit the RESS. Multiple coolant sacks may be packaged inside the battery housing, with each sack laying across a respective stack of battery cells. Alternatively, a single enlarged coolant sack may span across and cover all of the cell stacks inside a pack or module to significantly increase the coolant fluid available for any TR-initiating battery cells. For multi-sack configurations, a coolant manifold may fluidly connect the neighboring coolant sacks across the rows of stacked cells to increase the coolant fluid available to a cell in runaway anywhere in the RESS. With lower energy released to a TR-triggering cell's solid can, can-to-can (C2C) barrier sizing within the battery case may be reduced to prevent C2C propagation. An optional pressurized tube containing fluid may be used to force fluid into a failed cell regardless of vehicle orientation. As noted above, a dedicated coolant flood port may be added to the cell container, e.g., to the header of the can, to enable the introduction of LIC fluid directly into the battery cell.

Figure 2:
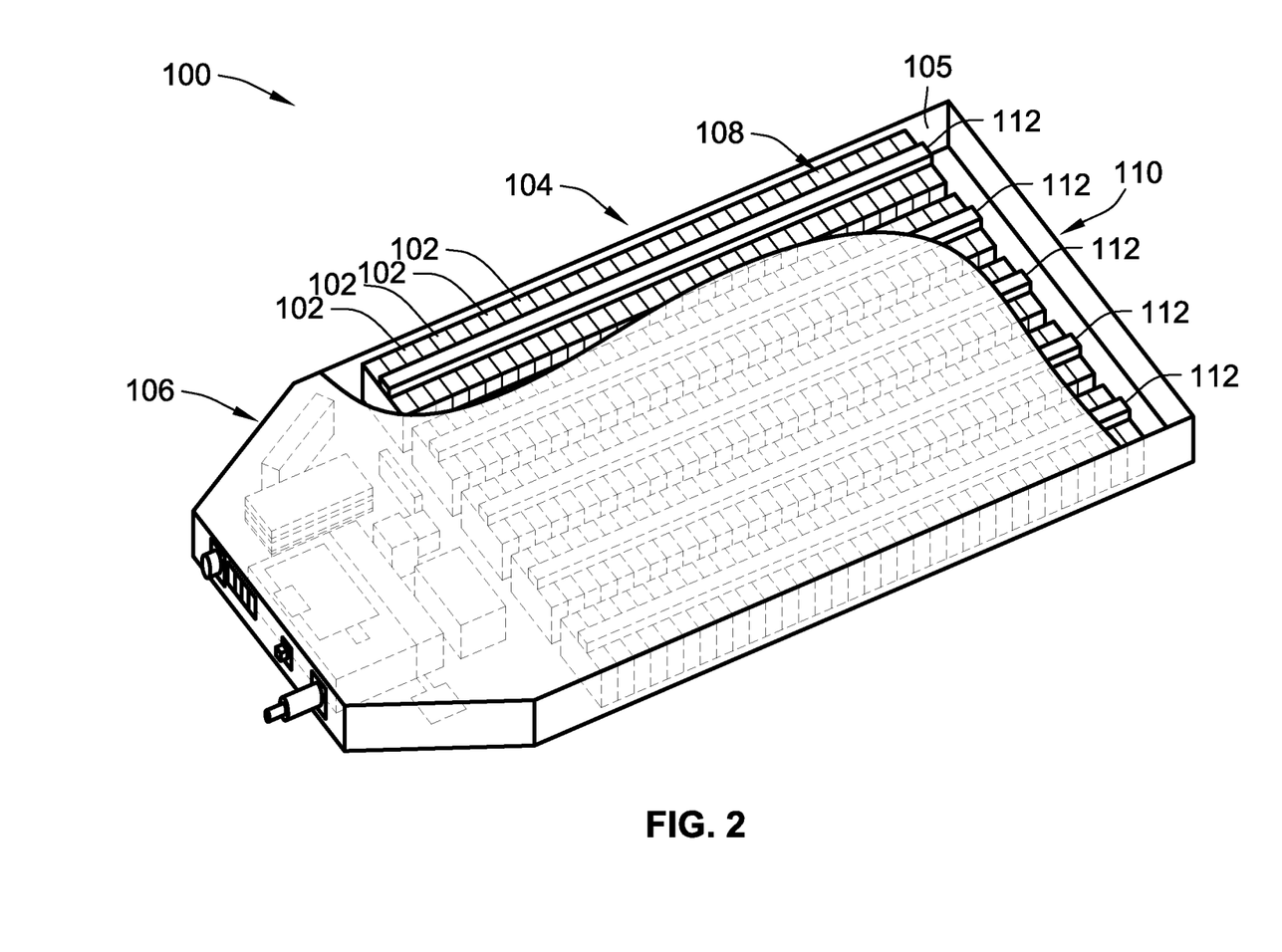
FIG. 2 is an enlarged, perspective-view illustration of a representative battery assembly with an array of battery cells cooled by liquid immersion cooling using a PTM system with dielectric fluid quenching sacks in accord with aspects of this disclosure.

FIG. 2 presents a more detailed depiction of a representative battery assembly 100, which is portrayed as a prismatic can-type traction battery pack for powering the electrified powertrain and electronic components of a motor vehicle, such as vehicle hardware components 16 and traction motor 78 of automobile 10 in FIG. 1. It should be appreciated, however, that disclosed concepts may be implemented for both vehicular and non-vehicular applications alike. Moreover, recitation of "passive thermal management" in the Description and Claims does not per se require the entire thermal management system be passive; rather, many of the passively activated quenching features presented herein may be incorporated into both ATM and PTM system architectures.

In the non-limiting example of FIG. 2, a group of prismatic battery cells 102 is stacked side-by-side and arranged in a rectangular array (e.g., five rows of thirty (30) cells) that is enclosed within an electrically insulated and protective battery assembly case (shown hidden at 104; also referred to herein as "pack case"). This pack case 104 may be partitioned into two distinct sections: a power electronics compartment 106 that contains an assortment of battery power electronics (e.g., traction PIM, CMU, sensor package, etc.); and a cell compartment 108 that contains the stacked battery cells 102, a senseline assembly (not shown), and an interconnect board (not shown). The battery pack case 104 may be constructed of a metallic, polymeric, or fiber-reinforced polymer (FRP) material, including combinations thereof, to satisfy various mechanical, manufacturing, and thermal design specifications. The battery pack case 104 may have a relatively flat construction with an octahedral shape, as shown, or may be constructed in other regular and irregular geometric configurations for accommodating application-specific parameters. Likewise, the battery assembly 100 may contain rectilinear stacks of lithium-ion prismatic can cells that share a common housing/case 104, as shown, or may contain groups of battery cells that are segregated into discrete battery modules, may contain pouch-type cells, cylindrical-type cells, or other cell form factor, and/or may employ other suitable battery technologies, such as those described above with respect to the battery cells 74 of FIG. 1.

To help stop/preclude an in-progress or impending high-heat thermal event, the battery assembly 100 of FIG. 2 is originally equipped with or retrofit to include a passive quenching system (PQS) 110 of the liquid immersion cooling type. This LIC-type PQS 110 may be generally typified by or, if desired, may consist essentially of one or more coolant-dispensing fluid containers 112 designed to flood TR-initiating cells with a liquid immersion coolant (shown schematically at 101 in FIG. 3). The immersion coolant 101 (also referred to as "liquid immersion cooling fluid" or "coolant" for brevity) may be any suitable thermally conductive dielectric or electrically insulative liquid, including single-phase and two-phase hydrocarbon and fluorocarbon-based coolants. According to the illustrated example, there are five (5) passively activated fluid containers 112 housed inside the battery pack case 104 of FIG. 2, each located between a top-mounted battery case cover (shown hidden at 105) and a respective one of the rows of stacked battery cells 102. It should be appreciated that the number, location, size, and/or orientation of fluid containers in a particular battery assembly may be varied from that shown in the drawings to accommodate other applications and associated design parameters.

Figures 3, 4A, 4B:
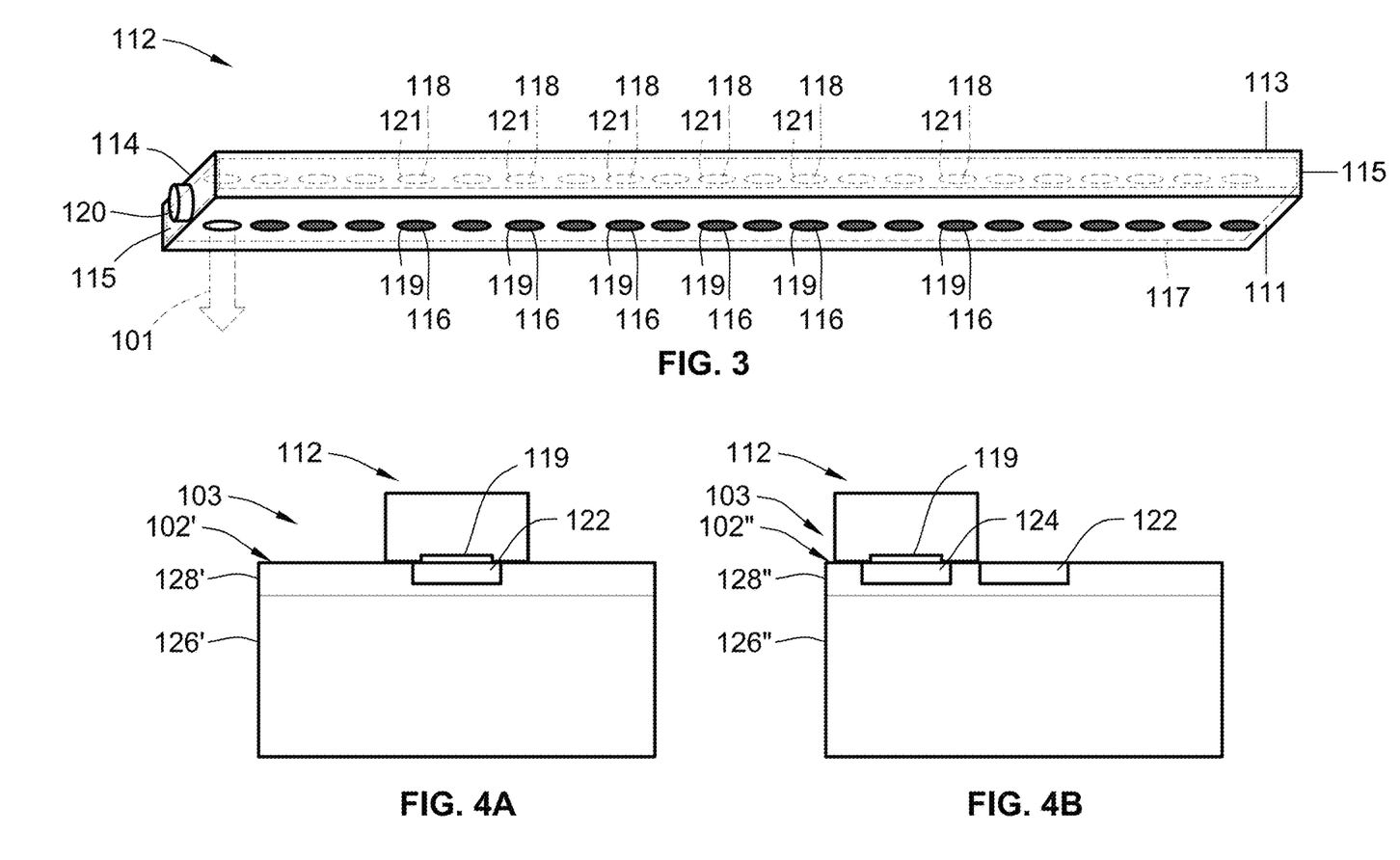
FIG. 3 is an enlarged, perspective-view illustration of one of the representative dielectric fluid quenching sacks of FIG. 2.
FIGS. 4A and 4B are schematic end-view illustrations of lithium-class prismatic can cells liquid immersion cooled via dielectric fluid quenching sacks using a shared fluid vent (FIG. 4A) or a dedicated flood port (FIG. 4B) in accord with aspects of the disclosed concepts.

Simplicity of design and ease of manufacture may necessitate that all of the fluid containers 112 in a given battery assembly 100 be substantially structurally identical to one another. To that end, all five fluid containers 112 of FIG. 2 may be described below with respect to the fluid container 112 illustrated in FIG. 3. Each fluid container 112 may be internally pressurized and may have an elongated hexahedral body 114 that is shaped and sized to fixedly mount inside the pack case 104 and seat on top of a cell stack, interposed between the battery cells 102 and case cover 105. For at least some designs, the fluid container 112 may be a flexible bag that is formed, in whole or in part, from a polymeric material as a liquid-tight, single-piece structure. The container body 114 of FIG. 3 is fabricated with a bottom wall 111, a top wall 113 opposite the bottom wall 113, and multiple sidewalls 115 that adjoin and interconnect the bottom and top walls 111, 113. With this design, the bottom wall 111 faces and, if desired, seats on the battery cells 102, whereas the top wall 113 faces an inner surface of the battery case's cover 105.

Continuing with the foregoing discussion of the representative fluid container 112 of FIG. 3, the fluid container 114 has one or more internal coolant compartments (shown hidden at 117) that stow therein a coolant fluid 101. The coolant compartment 117 of FIG. 3 is depicted as a lone inner chamber that extends substantially the entire length of the container body 114. While portrayed in the drawings as having a single, shared coolant compartment 117, it is envisioned that the fluid container 112 may include multiple discrete coolant-containing chambers. These discrete coolant chambers may be pre-pressurized and may be longitudinally spaced from one another along the length of the container body 114 with each coolant chamber located to align with a respective one of the battery cell 102. A fill cap 120 at the end of the fluid container 114 covers a fill pipe (not visible in this view) through which LIC fluid 101 may be poured into the coolant compartment 117.

To transmit LIC fluid 101 from the coolant compartment(s) 117 to the battery cells 102, the fluid container 112 is fabricated with multiple coolant fluid ports 119 (first fluid ports) that extend through the container body 114 and fluidly connect the coolant compartment 117 to the battery cells 102. For instance, the coolant fluid ports 119 of FIG. 3 may be arranged in a linear series that is spaced along the length of the container body 114 and extends through the bottom wall 111. While not per se required, all of the coolant fluid ports 119 may share a common shape and size (e.g., circular port with 5 millimeter (mm) diameter). For single-chamber designs, all of the coolant fluid ports 119 may fluidly connect with the shared coolant compartment 117. Conversely, for multi-chamber designs, each coolant fluid port 119 may fluidly connect with a respective one of the internal coolant-containing chambers. Each coolant fluid port 119 may fluidly connect to a respective battery cell 102 by a fluid coupling (e.g., pipe, hose, fitting, connector, etc.) or, as shown, by vertically aligning the port 119 directly over a cell vent (FIG. 4A) or a flood port (FIG. 4B) in the top of the battery cell 102.

To vent gases from the battery cells 102 through the fluid container 112 and cool the venting gases with the LIC fluid 101, the fluid container 112 may be fabricated with multiple venting fluid ports (shown hidden at 121 in FIG. 3) that extend through the container body 114, e.g., on a side of the coolant compartment 117 opposite that of the coolant fluid ports 119. These venting fluid ports 121 (second fluid ports) may be arranged in a linear series that is spaced along the length of the container body 114 and extends through the top wall 113 thereof. Similar to the coolant fluid ports 119, it may be desirable that all of the venting fluid ports 121 share a common shape and size (e.g., oval ports with 3 mm length and mesh screen). In the same vein, the venting fluid ports 121 may share a common shape and size with the coolant fluid ports 119; alternatively, any one or some or all of the coolant and venting fluid ports 119, 121 may have a distinct shape and/or size. It may be desirable that each coolant fluid port 119 be vertically aligned with and spaced directly across the body 114 from a respective venting fluid port 121, e.g., to facilitate TR gas venting from the cell 102, through the coolant port 119, into the chamber 117, and out of the venting port 121. For single-chamber designs, all of the venting ports 121 may fluidly connect with the shared coolant-containing chamber 117. Conversely, for multi-chamber designs, each venting port 121 may fluidly connect with a respective one of the internal coolant-containing chambers.

In order to retain the immersion cooling fluid 101 inside the fluid container 112 during normal use of the battery assembly 100, and passively release the cooling fluid 101 from the container 112 during select thermal events, a set of sacrificial (first) thermomechanical plugs 116 seals the coolant fluid ports 117 so long as the battery cells 102 operate within a system-calibrated acceptable temperature range (e.g., about 20 to 45° C. or about 70-115° F.). When one or more of the battery cells 102 reach a predefined (first) threshold temperature (e.g., battery-calibrated TR trigger temperature of about 80-120° C. or about 175-260° F.), sufficient thermal energy is released by the cells 102 to passively trigger one or more of the thermomechanical plugs 116 to open and thereby unseal the coolant fluid ports 117. Once unsealed, LIC fluid 101 may be pressure or gravity fed from the fluid container 112, through the now-open coolant fluid port(s) 117, and into the over-heating battery cell(s) 102. Alternatively, the fluid container 112 may be pressurized to force LIC fluid 101 through the ports 117 and into the cells 102.

In order to prevent inadvertent leakage of the immersion cooling fluid 101 from the fluid container 112 during normal use of the battery assembly 100, and passively release cell-generated gases through the container 112 during select thermal events, a set of sacrificial (second) thermomechanical plugs (shown hidden at 118 in FIG. 3) seals the venting fluid ports 121 along the top wall 113 of the container body 114 to hinder the escape of gases and liquids from the coolant compartment 117. The thermomechanical plugs 118 will open and thereby unseal the venting fluid ports 121 when the battery cells 102 reach a predefined (second) threshold temperature in which a sufficient amount of thermal energy is released by the cells 102 to passively trigger plug activation. Once unsealed, TR gases may exhaust from the over-heating battery cell(s) 102, into the fluid container 112, and out through the now-open venting fluid port(s) 121.

For simplicity of design and ease of manufacture, all of the thermomechanical plugs 116, 118 presented in FIG. 3 may be manufactured from the same material and with a shared shape and size. Each thermomechanical plug 116, 118 may be fabricated as a structural barrier that seats in and occludes and/or extends across and covers a respective fluid port 119, 121. Moreover, each of the thermomechanical plugs 116, 118 may be fabricated as is a single-piece structure made, in whole or in part, from a wax material, a metallic foil material, and/or a smart material. Some more specific, yet non-limiting examples, include one-piece plugs formed from a microcrystalline wax, one-piece caps formed from an aluminum film, and/or one-piece flaps formed from a shape-memory alloy (SMA) or a shape-memory polymer (SMP). On the other hand, the first set of thermomechanical plugs 116 may be formed, in whole or in part, from one material (e.g., a wax stopper) that is structurally engineered to passively open at a distinct threshold temperature (e.g., 90-95° C.). Contrastingly, the second set of thermomechanical plugs 118 may be formed, in whole or in part, from a distinct material (e.g., a polymeric lid) that is structurally engineered to passively open at a different threshold temperature (e.g., 110-115° C.).

FIGS. 4A and 4B are schematic end-view illustrations of a stack 103 of battery cells 102' and 102" that are liquid immersion cooled via dielectric fluid quenching sacks 112 using a shared fluid vent 122 (FIG. 4A) or a dedicated flood port 124 (FIG. 4B). In particular, each battery cell 102', 102" is assembled with an electrically insulated and protective (prismatic) cell case 126' and 126" having a cell header 128' and 128" mounted onto each cell case 126', 126". In both cell constructions, the cell header 128', 128" is provided with a cell vent 122 through which vents gases generated via the battery cell 102', 102". In the example of FIG. 4A, each coolant fluid port 119 fluidly connects to a respective battery cell 102' by vertically aligning directly over the cell vent 122. With this arrangement, the LIC fluid 101 may be gravity fed from the fluid container 112, through the port 119 and vent 122, and into the interior of the cell case 126'. In the example of FIG. 4B, each coolant fluid port 119 fluidly connects to a respective battery cell 102" by vertically aligning directly over the flood port 124. In so doing, LIC fluid 101 may be gravity fed from the fluid container 112, through the coolant port 119 and flood port 124, and into the interior of the cell case 126". As shown, the coolant fluid ports 119 in the fluid container 112 have a port size (e.g., cross-sectional area) that is less than the port size of the flood ports 124.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A passive thermal management (PTM) system for a battery assembly having a battery case containing multiple battery cells, each of the battery cells having a cell case with a cell vent or flood port in the cell case, the PTM system comprising:
a fluid container configured to mount inside the battery assembly, physically abut the cell cases of the battery cells, and insert between the battery case and the battery cells, the fluid container stowing therein a coolant fluid and defining a first plurality of fluid ports configured to face and thereby fluidly connect to the cell vent or flood port of the battery cells and dispense thereto the coolant fluid; and
a first plurality of thermomechanical plugs physically mounted to the fluid container and sealing the first plurality of fluid ports, wherein the first plurality of thermomechanical plugs is configured to passively open at a first predefined temperature to thereby unseal the first plurality of fluid ports such that the coolant fluid is fed from the fluid container into the battery cells.

2. The PTM system of claim 1, wherein each of the thermomechanical plugs is seated inside of and occludes or extends across and covers a respective one of the fluid ports defined in the fluid container.

3. The PTM system of claim 1, wherein each of the thermomechanical plugs is a single-piece structure made with a wax material, a metallic foil material, and/or a smart material.

4. The PTM system of claim 3, wherein the single-piece structure is formed from a microcrystalline wax, an aluminum film, a shape-memory alloy, and/or a shape-memory polymer.

5. The PTM system of claim 1, wherein the first predefined temperature is a battery-calibrated thermal runaway onset temperature of between about 80 and 120 degrees Celsius.

6. The PTM system of claim 1, wherein the fluid container includes opposing bottom and top walls, the bottom wall facing the battery cells, and the top wall facing the battery case, wherein the first plurality of fluid ports is spaced along and extends through the bottom wall, and wherein each of the first plurality of thermomechanical plugs is mounted to the bottom wall of the fluid container.

7. The PTM system of claim 6, wherein the fluid container further defines a second plurality of fluid ports spaced along and extending through the top wall, the second plurality of fluid ports configured to vent therethrough gases generated via the battery cells.

8. The PTM system of claim 7, further comprising a second plurality of thermomechanical plugs sealing the second plurality of fluid ports and configured to passively open at a second predefined temperature to thereby unseal the second plurality of fluid ports.

9. The PTM system of claim 8, wherein the first plurality of thermomechanical plugs is each formed with a first material configured to passively open at the first predefined temperature, and the second plurality of thermomechanical plugs is each formed with a second material, distinct from the first material, configured to passively open at the second predefined temperature, distinct from the first predefined temperature.

10. The PTM system of claim 1, wherein each of the cell cases includes the cell vent through which vents gases generated via the battery cell, and wherein the first plurality of fluid ports directly fluidly connects to the cell vents to dispense thereto the coolant fluid.

11. The PTM system of claim 1, wherein each of the cell cases includes the flood port through which enters liquid coolant, the cell case further including a cell vent through which vents gases generated via the battery cell, and wherein the first plurality of fluid ports directly fluidly connects to the flood ports to dispense thereto the coolant fluid.

12. The PTM system of claim 11, wherein each of the first plurality of fluid ports has a first port size and each of the flood ports has a second port size greater than the first port size.

13. The PTM system of claim 1, wherein the battery cells include multiple mutually parallel rows of stacked battery cells housed inside the battery case, and wherein the fluid container includes multiple fluid containers each configured to mount inside the battery assembly and insert between the battery case and a respective one of the rows of stacked battery cells.

14. The PTM system of claim 1, wherein the fluid container includes a flexible bag formed as a single-piece structure from a polymeric material.

15. The PTM system of claim 1, wherein the coolant fluid is gravity fed from the fluid container to the battery cells or the fluid container is pressurized to pressure feed coolant fluid to the battery cells.

16. A motor vehicle, comprising:
a vehicle body;
a plurality of road wheels attached to the vehicle body;
a traction motor attached to the vehicle body and operable to drive one or more of the road wheels to thereby propel the motor vehicle;
a traction battery pack attached to the vehicle body and electrically connected to the traction motor, the traction battery pack including a battery case containing a row of battery cells, each of the battery cells having a cell case with a cell header mounted onto the cell case, and an opening in the form of a gas vent or a flood port in the cell header; and
a thermal management system, including:
a fluid container mounted inside the traction battery pack, physically abutting the cell headers of the cell cases, and located between the battery case and the battery cells, the fluid container stowing therein a liquid immersion cooling (LIC) fluid, the fluid container defining through a bottom wall thereof a plurality of fluid ports each facing and thereby fluidly connected to a respective one of the openings of the battery cells to dispense thereto the LIC fluid; and
a plurality of thermomechanical plugs each seated inside of and sealing a respective one of the plurality of fluid ports of the fluid container, wherein each of the thermomechanical plugs is configured to passively open at a predefined temperature to thereby unseal the respective fluid port such that the LIC fluid is gravity fed from the fluid container into the respective battery cell.

17. A method of assembling a passive thermal management (PTM) system for a battery assembly having a battery case containing multiple battery cells, each of the battery cells having a cell case with a cell vent or flood port into the cell case, the method comprising:

mounting a fluid container inside the battery assembly such that the fluid container physically abuts the cell cases of the battery cells and is located between the battery case and the battery cells, the fluid container stowing therein a coolant fluid and defining a first plurality of fluid ports configured to face and thereby fluidly connect to the cell vent or flood port of the battery cells and dispense thereto the coolant fluid; and sealing the first plurality of fluid ports with a first plurality of thermomechanical plugs mounted directly to the fluid container, wherein the first plurality of thermomechanical plugs is configured to passively open at a first predefined temperature to thereby unseal the first plurality of fluid ports such that the coolant fluid is fed from the fluid container into the battery cells.

18. The method of claim 17, wherein each of the thermomechanical plugs is a single-piece structural barrier seated in and/or extending across a respective one of the fluid ports.

19. The method of claim 17, wherein the fluid container includes opposing bottom and top walls, the bottom wall facing the battery cells, and the top wall facing the battery case, and wherein the first plurality of fluid ports is spaced along and extends through the bottom wall.

20. The method of claim 19, wherein the fluid container further defines a second plurality of fluid ports spaced along and extending through the top wall, the second plurality of fluid ports configured to vent therethrough gases generated via the battery cells, the PTM system further comprising a second plurality of thermomechanical plugs sealing the second plurality of fluid ports and configured to passively open at a second predefined temperature to thereby unseal the second plurality of fluid ports.

* * * * *